No. 617,268. Patented Jan. 3, 1899.
A. L. ADAMS.
MAGAZINE CAMERA.
(Application filed July 7, 1898.)

(No Model.) 4 Sheets—Sheet 1.

WITNESSES INVENTOR
A. L. Adams
by Wilkinson & Fisher
Attorneys.

No. 617,268. Patented Jan. 3, 1899.
A. L. ADAMS.
MAGAZINE CAMERA.
(Application filed July 7, 1898.)
(No Model.) 4 Sheets—Sheet 2.
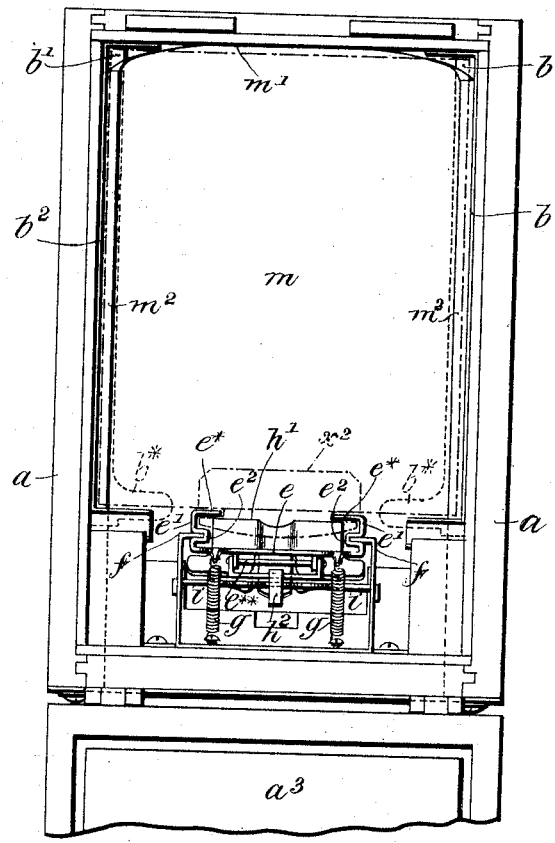
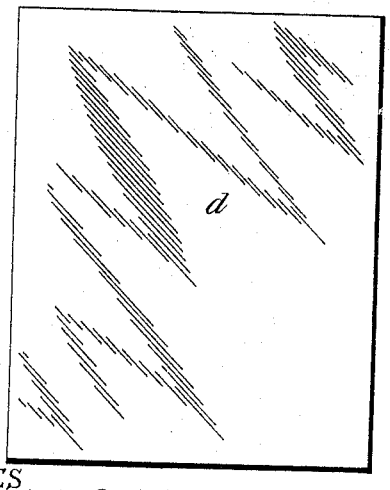
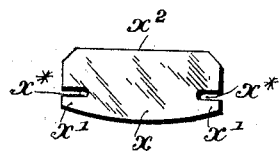
WITNESSES
INVENTOR
A. L. Adams.
by Wilkinson & Fisher, attys.

No. 617,268. Patented Jan. 3, 1899.
A. L. ADAMS.
MAGAZINE CAMERA.
(Application filed July 7, 1898.)

(No Model.) 4 Sheets—Sheet 3.

WITNESSES

INVENTOR
A. L. Adams.
by Wilkinson & Fisher
Attorneys.

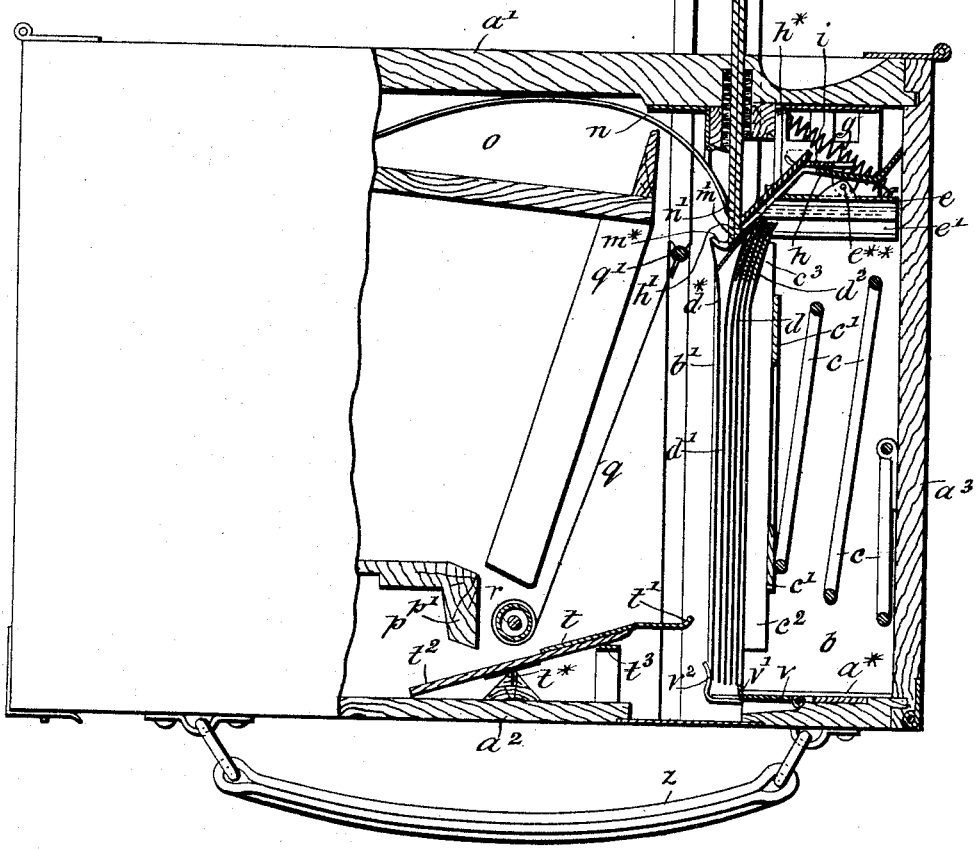

UNITED STATES PATENT OFFICE.

ARTHUR LEWIS ADAMS, OF LONDON, ENGLAND.

MAGAZINE-CAMERA.

SPECIFICATION forming part of Letters Patent No. 617,268, dated January 3, 1899.

Application filed July 7, 1898. Serial No. 685,343. (No model.)

*To all whom it may concern:*

Be it known that I, ARTHUR LEWIS ADAMS, manufacturer, a subject of the Queen of Great Britain, residing at 26 Charing Cross road, London, England, have invented certain new and useful Improvements in or Relating to Film-Changing Photographic Cameras, of which the following is a specification.

This invention relates to photographic cameras of that class in which a number or series of cut films or flexible sensitive surfaces (which latter, for the sake of brevity, I shall hereinafter refer to as "films") are arranged as a pack and are one by one removed after exposure.

I will now proceed to describe my present invention, with reference to the drawings hereunto annexed.

Figure 1:
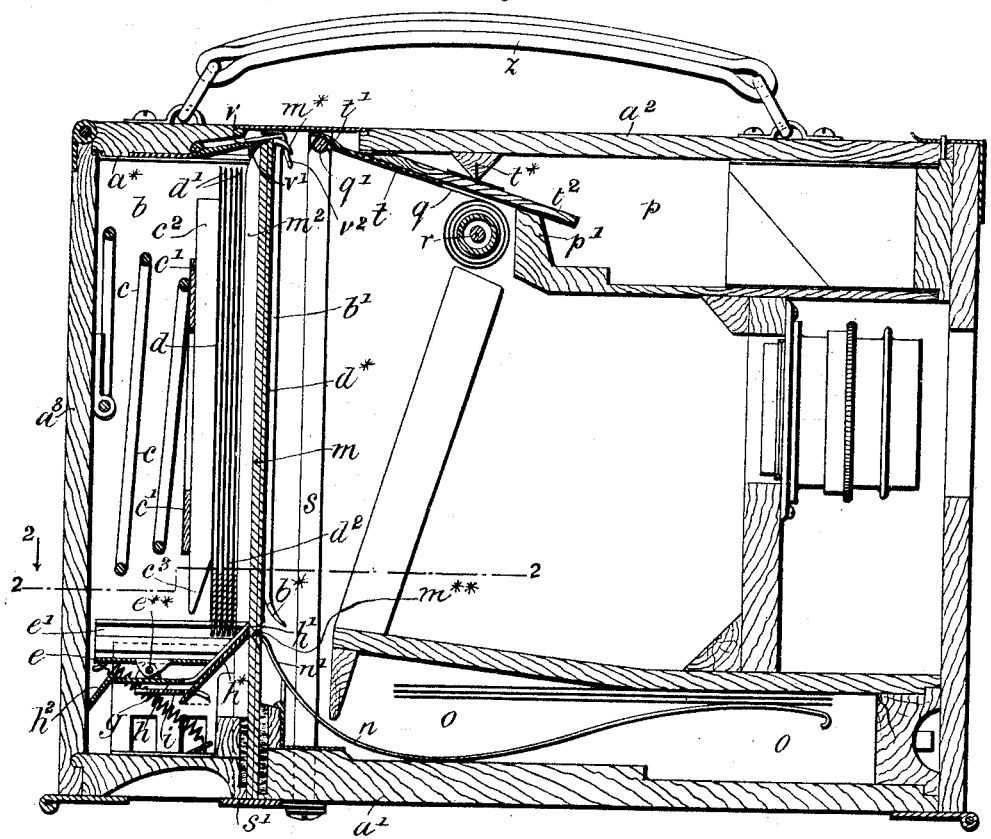
Figure 2:
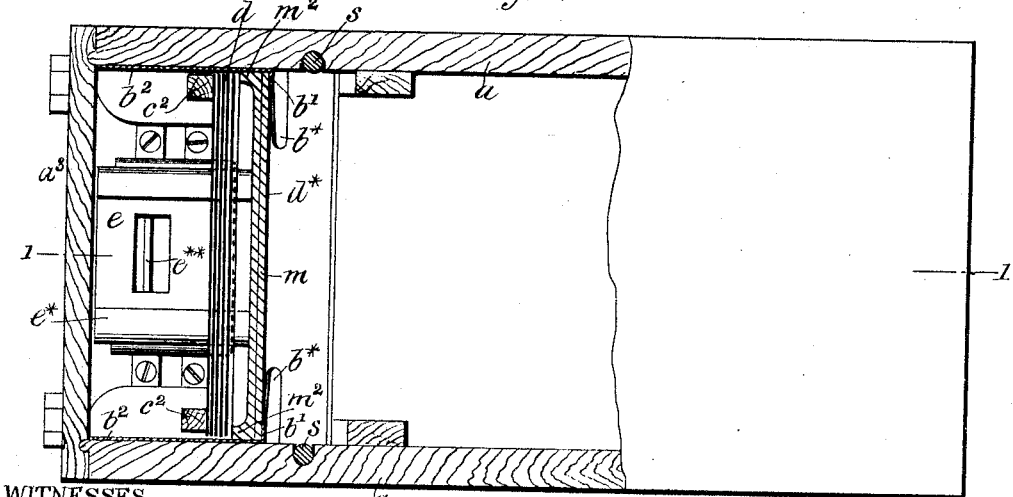
Figure 6:
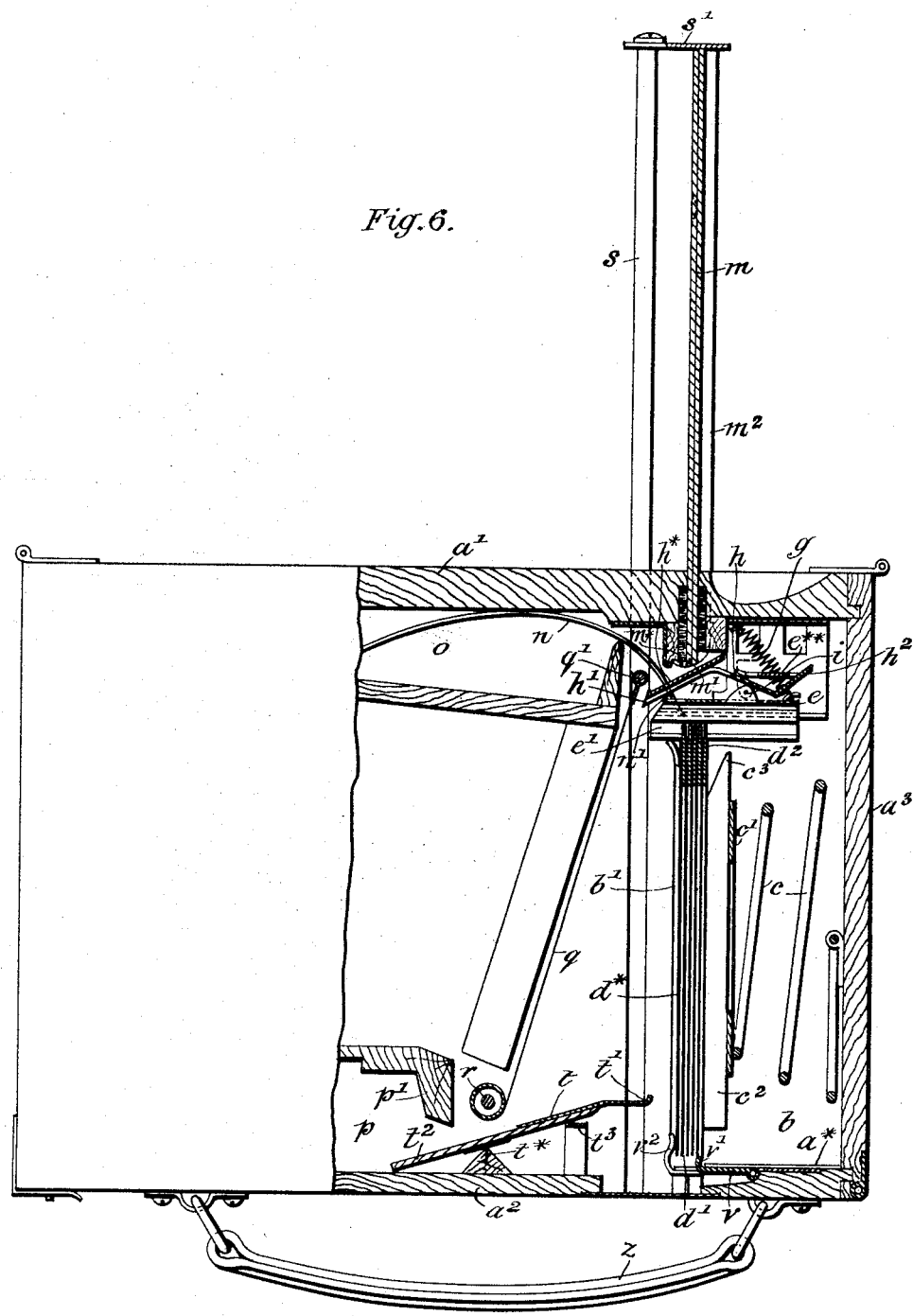

Figure 1 is a vertical longitudinal sectional view on line 1 1, Fig. 2, of a camera constructed according to the present invention. Fig. 2 is a horizontal sectional view on line 2 2, Fig. 1, looking in the direction of the arrow 2. Fig. 3 is a back end view of the camera with the door or end flap for closing the magazine open, showing the interior of said magazine. Fig. 4 shows a plain rectangular film without any notching along the edges for use in my camera. Fig. 5 shows the "insertion-piece," which may be formed of flexible thin sheet metal or celluloid or any other suitable material or combination of two or more materials. Fig. 6 is a similar view to Fig. 1, showing the septum withdrawn and the camera in the position in which same is held while changing each film—*i. e.*, reversed with regard to the position shown in Fig. 1. Fig. 7 is a similar view to Fig. 6, but with the septum pushed partly in and showing the consequently altered positions of the parts.

Similar letters of reference indicate corresponding parts throughout the views.

In the drawings at Figs. 1 to 3 I have shown that side $a^2$ of the camera uppermost on which is mounted the handle $z$, (such handle being mounted on this side, so that the septum does not show when the camera is carried in this position,) and consequently the camera has to be reversed to the position shown in Figs. 6 and 7 at each film-changing operation; but for the purpose of describing my invention I prefer to consider and designate the side $a'$ as the top and will describe the camera as though it were always carried, held, used, and operated in the position shown in Figs. 6 and 7.

I use any suitable camera case or box $a$ with any suitable lens-shutter, &c., and the films are arranged as a pack $d$ in a chamber or magazine $b$, formed to receive same in the rear part of the camera $a$, a door $a^3$ or other suitable means being provided to afford access to said magazine $b$, and a suitable spring or springs, such as $c$, being provided to act on the rear of said pack, (this spring $c$ may advantageously be attached at one end to the inside of the door $a^3$ and the other end attached to a metal plate $c'$, carrying vertical presser bars or ribs $c^2$ on the face thereof, which bars $c^2$ bear against the vertical side edges of the back of the pack, as shown in Figs. 1 and 2, the top end of each said rib $c^2$ being beveled off at $c^3$, see Figs. 1, 6, and 7, as and for the purposes hereinafter described,) said spring or springs serving to force the whole pack forwardly against a rabbet $b'$, which may advantageously be arranged as a flange formed on the front end of a metal plate $b^2$, forming the smooth metal lining of each side of the magazine $b$, all such parts being of any suitable character adapted for the purpose.

The bottom edge $d'$ of the pack of films $d$ rests either on the bottom $a^\times$ of the camera-case $a$ or on any suitable support arranged on or above said camera-bottom $a^\times$, along which bottom or support the pack $d$ can readily slide or be moved forwardly.

The loose back instead of being made, as shown, of thin sheet-metal plate $c'$, carrying ribs $c^2$ thereon, may be of any other suitable material, and where such back is of about the same size as the films may be formed with the upper edge or upper part thereof beveled or curved rearwardly, or such back may be formed less in height than the films $d$, so as to permit the upper edge $d^2$ of the pack of films $d$ to be bent or moved rearwardly in the operation of changing, as hereinafter described—for instance, as shown in Fig. 7.

Over the magazine $b$ and above the top edge $d^2$ of the pack of films $d$ and so as to be clear of said films I arrange a slide-piece $e$, having formed therein two parallel grooved ways $e'$, disposed opposite one another and extending horizontally (or thereabout) from front to rear, or thereabout, over said magazine $b$ and normally extending—$i.\ e.$, when the septum $m$ is withdrawn (see Fig. 6)—slightly in front of the position in which the front film will be held when brought up to register against the rabbets $b'$ ready for exposure. This sliding device $e$ is also provided with two guideways $e^2$ to fit over and slide upon the guide-rails $f$, fixed to the camera-top or arranged in a suitable support fixed to said top, the said two grooved ways $e'$ being thus carried on the slide $e$ in such a way that a spring or springs $g$, attached at one end to said slide and at the other end to the camera-case $a$, will normally keep said slide $e$ pressed forwardly—$i.\ e.$, toward the lens—until same is arrested, either by coming against the septum, hereinafter described, or against tops (not shown) provided for this purpose. Acting in conjunction with this slide $e$ and hinged or flexibly connected thereto at $e^{\times\times}$ is a finger or claw-like device $h$, (which I will hereinafter refer to as the "finger,") the free end $h'$ of which extends forwardly and is normally forced away from the grooved ways $e'$ (when the latter are in the forward position shown in Fig. 6) by the tail end $h^2$ coming against the fixed striking-plate $i$, while when said finger $h$, together with the slide $e$, is moved rearwardly, as hereinafter described—$i.\ e.$, from the position shown in Fig. 6 into the position shown in Fig. 7—the end $h'$ of said finger $h$ will descend into line (or thereabout) with the grooves $e'$ in the slide $e$, and thereby engage and move rearwardly therewith the insertion-pieces $x$, Fig. 5, which are supported in said grooved ways $e'$. The front end $h'$ of the said finger $h$ is beveled and provided with a cam-like surface $h^\times$ or arranged in such wise that on the descent onto same of a vertically-traveling septum $m$ or the like as hereinafter described, thereby the free end $h'$ of said finger $h$ will be pressed downward and rearward (from the position shown in Fig. 6 to the position shown in Fig. 7) and at same time will carry back therewith the aforesaid slide $e$ and grooved ways $e'$ therein against the action of the aforesaid spring or springs $g$, which (when the septum $m$ is removed) will return the grooved ways $e'$ and finger $h$ forwardly, and thereby cause said finger $h$ also to rise, as aforesaid, as shown in Fig. 6.

The septum $m$ is arranged to pass through the top $a'$ of the camera $a$, any suitable means being provided where same passes through the camera-case $a$ to guide same and keep same light-tight and is adapted to be reciprocated in a plane just to the rear of the rabbets $b'$ of the magazine—$i.\ e.$, just in the rear of the vertical plane of the front film $d^\times$—where same is brought up to register against said rabbets $b'$, (see Fig. 2,) and said septum is provided with a rounded edge $m'$ at its entering end and also with a hook or lip $m^\times$ on the front side of such end, this latter—$i.\ e.$, the hook $m^\times$—being for the purpose of withdrawing the exposed film $d^\times$ upon the withdrawal of the septum $m$, suitable means, such as a flat spring $n$ at each side, being provided with the free end $n'$, bearing against the septum $m$, to strip or remove the film $d^\times$ out of said septum $m$ as said film $d^\times$ is being withdrawn, and thereby transfer same into a suitable reservoir or chamber $o$, arranged to receive and hold such exposed films therein.

A recess $m^{\times\times}$ (see Fig. 1) is formed at each side of the septum $m$ to receive therein the end $n'$ of the strippers $n$ to insure the latter getting behind the film.

I further provide, according to my present invention, small insertion pieces or devices $x$, Fig. 5, for inserting between the films and arranged alternately therewith as a pack, these insertion-pieces $x$ being provided with a tongue $x'$ at each extremity and being of such a width that said tongue $x'$ will fit and slide easily in the aforesaid grooved ways $e'$, the notches $x^\times$ in said pieces $x$ being adapted to fit loosely over the edges $e^\times$ of the sliding device $e$, while the body part $x^2$ of such insertion-pieces $x$ depends below said grooved ways $e'$ and extends a short distance between the films, the said grooved ways $e'$ being such that the tongue $x'$ of said insertion-pieces $x$ can be placed therein from the rear and slide right through same and pass out of said grooved ways $e'$ at the front ends of the latter, as hereinafter explained. These insertion-pieces $x$ (which may, for example, be, say, one and one-half inches in width and three-fourths of an inch in depth) may be made of any suitable material, advantageously of celluloid or card, so as to be as light and noiseless as possible.

The films do not require to be either notched or backed, but are of any ordinary or suitable form, such as the usual rectangular-cut films, as shown in Fig. 4, and a number of such films and insertion-pieces $x$ are placed together alternately as a pack in the magazine $b$ of this camera $a$, according to my present invention, as follows: A film comes first against the rabbet $b'$ (or against the back of the septum $m$, if the latter be pushed in) and is clear of the aforesaid grooved ways $e'$, and then an insertion-piece $x$ is placed with its tongue $x'$ in said grooved ways $e'$, with the larger part $x^2$ thereof overlapping the film, then another film, and then another insertion-piece $x$, as before, and so on, as many as desired being placed in the magazine, according to the capacity of said magazine $b$. The aforesaid loose back $c'\ c^2$ is now placed in position and by means of any suitable spring, such as $c$, presses the whole pack firmly forward against the rabbet $b'$, if the septum $m$ is withdrawn, or against the back of the septum $m$, which latter is shown provided with a vertical rib or ridge $m^3$ down each vertical side edge thereof for the purpose of keeping the sensitive surface on the central part of the films from being rubbed or injured by the septum $m$ as same is withdrawn or inserted. The camera is now ready for use and the operation of changing the films is as follows: The camera is held in the position shown in Figs. 6 and 7, the septum $m$ is withdrawn, as shown in Fig. 6, and the front film $d^\times$ consequently is pressed forward (by the spring $c$) against the rabbets $b'$ and end $h^\times$ of the aforesaid finger $h$, and grooved ways $e'$ are now also pressed forward and the front part thereof lies in the path of travel of the septum $m$, as shown in Fig. 6. On forcing in the septum $m$ the entering end $m'$ thereof will first ride against the cam-like surface $h^\times$ or equivalent on the top or free end $h'$ of said finger $h$ and force the latter down in front of the insertion-pieces $x$ in said grooved ways $e'$, so as to engage the said insertion-pieces $x$ and move same and the whole pack (except the front film $d^\times$) rearwardly, or the upper edge $d^2$ of the said pack is bent or moved rearwardly, as shown in Fig. 7, as the said finger $h$ and grooved ways $e'$ are bodily moved rearwardly by the entering end $m'$ of the septum $m$. By this means the upper edge of the pack is separated and moved clear of the front film $d^\times$ (see Fig. 7) and leaving a clear space for the entering end $m'$ of the septum $m$ to pass in between the said front film $d^\times$ and the rest of the pack, so that the front film $d^\times$ is thus separated from the rest of the pack $d$ and is held exactly up to register and is "backed" or supported in a perfectly flat state (by said septum $m$) ready for exposure, while the inserted septum $m$ will prevent any light passing to the remainder of the pack during exposure. On withdrawal of the septum $m$ (after exposure) the separated film $d^\times$ is withdrawn therewith, as aforesaid, and stripped or removed therefrom by the stripper-springs $n$, and thereby transferred into a suitable storage chamber or receptacle $o$ or removed in any other suitable manner. The camera being held in position with the lens downwardly, it follows that when the septum $m$ is withdrawn thereupon the next following insertion-piece $x$, having no film in front of the lower portion $x^2$ thereof and nothing to prevent same sliding out of the front ends of said grooved ways $e'$, (the aforesaid finger end $h'$ being now in the raised position clear of said grooved ways $e'$, as shown in Fig. 6,) consequently this front insertion-piece $x$ will drop out of said grooved ways $e'$ and will fall toward the lens, and in order to guide each said loose insertion-piece $x$ into the chamber $p$, provided for same in the bottom of the camera, I mount a flexible sheet or curtain $q$ on a spring-roller $r$, this curtain $q$ extending across the full width of the interior of the camera and attached at $q'$ to the rigid rods $s$, which latter are attached at $s'$ (exterior of the camera) to the septum $m$, so that as the septum $m$ is withdrawn thereby the rods $s$ are simultaneously withdrawn, consequently drawing the curtain $q$ off the roller $r$ from the position shown in Fig. 1 to the position shown in Fig. 6, in which latter position the curtain $q$ guides the falling insertion-piece $x$ onto the now open trap-door $t$, hinged at $t^\times$ to the inside of the bottom $a^2$ of the camera-case $a$, whence said insertion-piece falls into the receptacle for same, the one end $t'$ of said trap-door $t$ lying in the path of travel of the rods $s$, so that on the insertion of the septum the inner ends of said rods $s$ will force said trap-door $t$ from the position shown in Fig. 6 into the closed position shown in Fig. 1, the other end $t^2$ of said trap-door being thereby forced against the edge $p'$ of the opening into the chamber $p$, whereby the latter is thus held lightly closed until the next withdrawal of the septum $m$, whereupon the spring $t^3$ below said trap-door $t$ will return same into the position shown in Figs. 6 and 7 to permit the next insertion-piece $x$ to enter the chamber $f$, and so on.

$v$ is a spring-platform mounted on the bottom of the camera, which lies in the path of travel of the septum $m$, which latter when inserted forces said platform $v$ against the under side of the bottom $a^2$, while when the septum is withdrawn thereupon the platform $v$ follows a short distance, and the central stop or projection $v'$ thereon is thereby placed in front of the lower edge $d'$ of the rest of the pack $d$ and acts as a stop to prevent the films from bulging along said edge $d'$ while the septum is withdrawn, while the two projections $v^2$ serve as stops to the front film $d^\times$.

$b^\times$ $b^\times$ are stops (advantageously formed by returning the ends of the rabbets $b'$) in front of the top of the pack of films to prevent the front film getting out of position when brought up to register or while stripping same out of the septum $m$ on withdrawal of the latter.

I do not confine myself to all the details exactly as hereinbefore set forth, as obviously modifications thereof may be used. For instance, I may use tongues instead of grooves for guiding the insertion-pieces $x$—that is to say, the latter may be notched and guided and travel on tongues or railways instead of in grooved ways—or I make such insertion-pieces $x$ of greater width than the films, and then these insertion-pieces $x$ may travel in or on either fixed or movable grooved ways or railways open or clear at each end, as before, for the insertion-pieces $x$ to be placed therein or thereon and to enable same to escape therefrom, as aforesaid, while the aforesaid finger $h$ would act as before. Moreover, such finger $h$, if desired, could be arranged and operated separately and independently of said grooved ways $e'$ or equivalent, but always so as to act in conjunction therewith for the aforesaid purpose of moving rearwardly the whole of the pack except the front film $d^\times$. The septum $m$ may be rigid or flexible, as desired. If desired, the film-changing mechanism may be arranged to operate at the side instead of over the top of the films, as aforesaid, and the insertion-pieces $x$ arranged midway or at any desired point with respect to the films.

Having thus described my invention, what I claim, and desire to secure by Letters Patent of the United States, is—

1. In a film-changing photographic camera, the combination of a magazine-chamber adapted to hold a number of rectangular-cut films arranged as a pack therein, movable grooved ways arranged to one side of said chamber and adapted to receive and hold therein a portion of insertion-pieces the lower part of which latter enter between the films these insertion-pieces and films being arranged alternately as a pack, a septum adapted to be reciprocated just behind and in a parallel plane with the front film when the latter is brought up to register, a rocking finger in front of said grooved ways adapted when rocked in one direction by the withdrawal of the septum to permit the escape of the foremost of the insertion-pieces from said grooved ways and when rocked in the other direction by the insertion of the septum adapted to press back the pack of insertion-pieces and films except the front film and thereby permit the introduction of said septum between the front film and the remainder of the pack substantially as and for the purposes hereinbefore described.

2. In a film-changing photographic camera, the combination of a magazine-chamber adapted to hold a number of rectangular-cut films arranged as a pack therein, movable grooved ways arranged above said chamber and adapted to receive and hold therein a portion of insertion-pieces the lower part of which latter enter between the films these insertion-pieces and films being arranged alternately as a pack, a septum adapted to be reciprocated just behind and in a parallel plane with the front film when brought up to register, a rocking finger in front of said grooved ways adapted when rocked in one direction by the withdrawal of the septum to permit the escape of the foremost of the insertion-pieces from said grooved ways and when rocked in the other direction by the insertion of the septum adapted to press back the pack of insertion-pieces and films except the front film and thereby permit the introduction of said septum between the front film and the remainder of the pack, a hook on the front inner end of the septum to withdraw the exposed film in front of said septum upon withdrawal of the latter and stripper-springs bearing against the upper part of said septum to remove said film from said septum into the receiving-chamber substantially as and for the purposes hereinbefore described.

3. In a film-changing photographic camera, the combination of a magazine-chamber adapted to hold a number of rectangular-cut films arranged as a pack therein, movable grooved ways arranged above said chamber and adapted to receive and hold therein a portion of insertion-pieces the lower part of which latter enter between the films, these insertion-pieces and films being arranged alternately as a pack, a septum adapted to be reciprocated just behind and in a parallel plane with the front film when brought up to register, a rocking finger in front of said grooved ways adapted when rocked in one direction by the withdrawal of the septum to permit the escape of the foremost of the insertion-pieces from said grooved ways and when rocked in the other direction by the insertion of the septum adapted to press back the pack of insertion-pieces and films except the front film and thereby permit the introduction of said septum between the front film and the remainder of the pack, a chamber adapted to receive and hold therein the insertion-pieces as same are released from the pack, a spring trap-door to said chamber adapted to open upon the withdrawal of the septum and to be closed by the insertion of the latter, a curtain mounted on a spring-roller inside said camera said curtain being attached to said septum and adapted to be unrolled by the withdrawal of the septum so as to guide the falling insertion-piece into said chamber substantially in the manner and for the purposes hereinbefore described.

4. In a film-changing photographic camera, the combination of a magazine-chamber adapted to hold a number of rectangular-cut films arranged as a pack therein, movable grooved ways arranged above said chamber and adapted to receive and hold therein a portion of insertion-pieces the lower part of which latter enter between the films these insertion-pieces and films being arranged alternately as a pack, a septum adapted to be reciprocated just behind and in a parallel plane with the front film when brought up to register a rocking finger in front of said grooved ways adapted when rocked in one direction by the withdrawal of the septum to permit the escape of the foremost of the insertion-pieces from said grooved ways and when rocked in the other direction by the insertion of the septum adapted to press back the pack of insertion-pieces and films except the front film and thereby permit the introduction of said septum between the front film and the remainder of the pack, a hook on the front inner end of the septum to withdraw the exposed film in front of said septum upon withdrawal of the latter, stripper-springs bearing against the upper part of said septum to remove said film from said septum into the receiving-chamber, a chamber adapted to receive and hold therein the insertion-pieces as same are released from the pack, a spring trap-door to said chamber adapted to open upon the withdrawal of the septum and to be closed by the insertion of the latter, a curtain mounted on a spring-roller inside said camera said curtain being attached to said septum and adapted to be unrolled by the withdrawal of the septum so as to guide the falling insertion-piece into said chamber substantially as and for the purposes hereinbefore described.

ARTHUR LEWIS ADAMS.

Witnesses:
ALFRED NUTTING,
HERBERT D. JAMESON.